US006811593B2

(12) United States Patent
Hansson et al.

(10) Patent No.: US 6,811,593 B2
(45) Date of Patent: Nov. 2, 2004

(54) AIR-CLEANING DEVICE AND METHOD FOR ARRANGING AIR CLEANING IN SENSITIVE ENVIRONMENTS

(75) Inventors: Tomas Hansson, Enköping (SE); Ulf Hörnqvist, Västerås (SE)

(73) Assignee: Toul Meditech AB, Vasteras (SE)

( * ) Notice: Subject to any disclaimer, the term of this patent is extended or adjusted under 35 U.S.C. 154(b) by 2 days.

(21) Appl. No.: 10/149,970

(22) PCT Filed: Mar. 8, 2002

(86) PCT No.: PCT/SE02/00415

§ 371 (c)(1),
(2), (4) Date: Aug. 19, 2002

(87) PCT Pub. No.: WO02/075221

PCT Pub. Date: Sep. 26, 2002

(65) Prior Publication Data

US 2003/0150328 A1 Aug. 14, 2003

(30) Foreign Application Priority Data

Mar. 20, 2001 (SE) .............................................. 0100971

(51) Int. Cl.[7] ......................... B01D 35/30; B01D 39/16; B01D 46/10

(52) U.S. Cl. ............................. 95/273; 55/356; 55/473; 55/DIG. 29

(58) Field of Search ..................... 95/273, 287; 96/224, 96/225; 55/356, 385.1, 385.2, 471, 410–416, 473, DIG. 29

(56) References Cited

U.S. PATENT DOCUMENTS

| | | | | | |
|---|---|---|---|---|---|
| 2,808,124 | A | * | 10/1957 | Attwood | 55/467.1 |
| 3,011,230 | A | * | 12/1961 | Potapenko | 96/224 |
| 3,107,863 | A | * | 10/1963 | Potapenko | 362/96 |
| 3,273,323 | A | * | 9/1966 | Whitfield | 55/385.2 |
| 3,279,883 | A | | 10/1966 | Thompson et al. | |
| 3,294,480 | A | | 12/1966 | Potaoenko | |
| 3,363,539 | A | * | 1/1968 | Taylor et al. | 454/60 |
| 3,422,600 | A | * | 1/1969 | Chamberlain | 96/58 |
| 3,462,920 | A | * | 8/1969 | Denny | 55/413 |
| 3,486,308 | A | * | 12/1969 | Burt | 96/17 |
| 3,721,067 | A | * | 3/1973 | Agnew | 95/273 |
| 3,724,172 | A | * | 4/1973 | Wood | 95/287 |
| 3,726,203 | A | * | 4/1973 | Lindestrom | 454/189 |
| 3,820,536 | A | * | 6/1974 | Anspach, Jr. et al. | 128/202.13 |
| 3,827,862 | A | * | 8/1974 | Berlant | 422/121 |
| 3,838,556 | A | * | 10/1974 | Finger | 55/385.2 |
| 3,923,482 | A | | 12/1975 | Knab et al. | |
| 3,935,803 | A | * | 2/1976 | Bush | 454/189 |
| 4,023,472 | A | * | 5/1977 | Grunder et al. | 454/338 |
| 4,045,192 | A | * | 8/1977 | Eckstein et al. | 96/224 |
| 4,191,543 | A | * | 3/1980 | Peters | 96/223 |
| 4,412,849 | A | * | 11/1983 | Shahani | 95/273 |
| 4,427,427 | A | * | 1/1984 | DeVecchi | 55/358 |
| 4,531,956 | A | * | 7/1985 | Howorth | 96/223 |
| 4,832,716 | A | * | 5/1989 | McMichael | 55/467 |
| 4,880,581 | A | * | 11/1989 | Dastoli et al. | 264/39 |
| 5,129,928 | A | * | 7/1992 | Chan et al. | 95/273 |
| 5,225,167 | A | * | 7/1993 | Wetzel | 96/224 |
| 5,399,319 | A | * | 3/1995 | Schoenberger et al. | 96/224 |

(List continued on next page.)

FOREIGN PATENT DOCUMENTS

| | | | |
|---|---|---|---|
| DE | 40 14 795 C1 | * | 2/1992 |
| DE | 200 18 765 | | 2/2001 |

*Primary Examiner*—Robert H. Spitzer
(74) *Attorney, Agent, or Firm*—Birch, Stewart, Kolasch & Birch, LLP

(57) ABSTRACT

The present invention relates to an air-cleaning device for air cleaning in sensitive environments such as operating rooms, drug manufacture, microchip production (processing industry) and similar areas. More specifically, the present invention relates to an air-cleaning device that allows for precise distribution and flow rate within sensitive environments by utilizing a combination of adjustable air ducts, filters, and air distribution which is mobile and changeable.

9 Claims, 4 Drawing Sheets

U.S. PATENT DOCUMENTS

| | | | | | |
|---|---|---|---|---|---|
| 5,453,049 | A | * | 9/1995 | Tillman, Jr. et al. | 454/228 |
| 5,487,766 | A | * | 1/1996 | Vannier | 55/356 |
| 5,616,172 | A | * | 4/1997 | Tuckerman et al. | 96/16 |
| 5,665,128 | A | * | 9/1997 | Peters et al. | 96/399 |
| 5,688,297 | A | * | 11/1997 | Spengler | 55/356 |
| 5,997,619 | A | * | 12/1999 | Knuth et al. | 96/224 |
| 6,063,170 | A | * | 5/2000 | Deibert | 96/224 |
| 6,099,607 | A | * | 8/2000 | Haslebacher | 55/356 |
| 6,387,140 | B1 | * | 5/2002 | Choi | 55/323 |
| 6,464,760 | B1 | * | 10/2002 | Sham et al. | 96/117.5 |
| 6,626,971 | B1 | * | 9/2003 | Forbert et al. | 55/385.2 |
| 2001/0043887 | A1 | * | 11/2001 | Morneault et al. | 422/121 |
| 2002/0121196 | A1 | * | 9/2002 | Thakur et al. | 96/224 |

* cited by examiner

AIR-CLEANING DEVICE AND METHOD FOR ARRANGING AIR CLEANING IN SENSITIVE ENVIRONMENTS

This application is the national phase under 35 U.S.C. § 371 of PCT International Application No. PCT/SE02/00415 which has an International filing date of Mar. 8, 2002, which designated the United States of America.

TECHNICAL FIELD

The present invention relates to an air-cleaning device for air cleaning in sensitive environments such as operating rooms, drug manufacture, micro-chip production (processing industry) and similar areas. The present invention also concerns a use of an air-cleaning device. The present invention also relates to a method of producing an air-cleaning device

BACKGROUND

Ventilation with efficient removal of particles has become more and more important in sensitive environments such as e.g. operating rooms, drug manufacture, micro-chip production (processing industry) and similar areas. It has been chosen to exemplify by pointing to the problems concerning surgical operations and the concrete problem associated with the environment in operating rooms.

There is a continual development towards reducing the risk of being infected during operations related to surgery, which results in human suffering and heavy expenses for the society. Among the most critical operations are the orthopedic, where the risk of subsequent infections is considerably increased if the surrounding air, personnel and instruments cannot offer a very high purification level. In recent years, a lot of research has been done on the impact of air during different types of operations. The performed studies show that already after about 30 min the surrounding air is so contaminated with bacteria-carrying particles that the risk of infection is increased by several percent, even if everything present in the operating room at the beginning of an operation is sterilized.

The problem is largely due to the fact that the operating personnel is moving and emits different kinds of particles from e.g. skin and textiles. There are a number of different air-cleaning solutions and ventilation systems offering a very high air quality without placing too much burden on the personnel. One of the most efficient ways is a laminar-flow ceiling with an HEPA-filter (High-Efficiency Particulate Air filter) which cleans the incoming air with 99.9997% confidence. The system is often used in particular in operating rooms and is also referred to as "clean-air ceiling". The system creates a laminar airflow (LAF), i.e. the entire air mass in a defined area is moving with the same velocity in parallel lines and with a minimum of disturbances. The optimal air velocity for such a system is 0.3–0.4 m/sec to avoid disturbing turbulence to as great extent as possible while removing airborne particles. The laminar airflow can be provided vertically or horizontally. The above-described system has contributed to reducing the number of infections during e.g. hip-joint operations by about 8%. The system is ventilating in an advanced way, whereby between 15–20 changes of air per hour are required according to Swedish regulations, The system is a comparatively expensive ventilation alternative. The installation cost amounts to about 2 million SEK, which explains the limited number of installations/hospital. The system is non-optimal in the sense that there are always disturbances in the laminar airflow between the ceiling and patient, such as an operating lamp, the heads of the operating personnel, and various equipment hanging from the ceiling. These disturbances create turbulence in the airflow, which may result in particles being left in the critical area and thereby constituting a risk. Measurements have also been performed in order to map the positions of the operating personnel around the operating table. In several cases, the personnel have been shown to be standing in the way of the streaming air.

The conclusion is that every type of operation in an LAP has to be carefully studied as for the relation between air-stream, personnel and instrument table. To sum up, the described system, laminar-flow ceiling with HEPA-filter, can be said to work well as ventilation in the operating room but it does not guarantee a sufficiently clean air over the operating table (patient) and the instrument table as people start moving around and emitting contaminated particles. The described problems make the prevailing systems sensitive to surrounding factors and therefore the air cleaning does not provide the aid it aims at.

One problem is the throughput in an operating room. Placing a patient in the operating room leads to a very high bacterial contamination of the air and arranging the instruments at the same time is therefore highly inappropriate. This results in unnecessary waste of time during switching between operations (every single minute is precious). A problem associated with fixed equipment (ultra-clean rooms) is that it is difficult for the operating crew not to stand in the way of the clean air.

DE-C1-4014795 concerns an air-cleaning device for operating rooms comprising a laminar-flow ceiling with HEPA-filter. As can be seen from the drawing, a cleaned airflow leaves the laminar-flow ceiling. The laminar airflow is thereafter disturbed between the ceiling and patient by an operating lamp. The disturbance may create turbulence in the airflow. Part of the airflow is allowed to pass through a channel in the lamp by means of a fan arranged therein. In this way, an overpressure is created in the operating room and the airflow passing in the operating lamp has a different velocity compared to the airflow from the laminar-flow ceiling. There is no air-cleaning in the lamp. The operating lamp is fixed to the laminar-flow ceiling and operations therefore have to be performed in the very proximity of the installation.

U.S. Pat. No. 5,225,167 relates to a fixed air-cleaning device comprising an HEPA-filter. The air-cleaning device does not include a screen with pressure-fall increasing means to provide a laminar/low-turbulent airflow.

DESCRIPTION OF THE INVENTION

The present invention aims at minimizing the above-mentioned drawbacks according to the state of the art. An object of the present invention is to achieve a user-friendly, reliable and cost-efficient device, which is able to clean and distribute air in the most critical environments with a highly limited impact of outer factors such as people in movement or equipment. Thereby, a broader object of the present invention is, among other things, to achieve an air-cleaning device which enables distribution of a clean, low-turbulent/laminar airflow in sensitive environments (such as for instance above an operating table) and distribute the airflow over a specific area (e.g. an operating area or an area for application of micro-chip components) without the airflow being disturbed by personnel or equipment in the room. Furthermore, the intention is to achieve a flexible air-cleaning device with an air-distributing screen, which ensures a low-turbulent/laminar airflow while presenting a simple design being uncomplicated to use and easy to clean. A further object is to provide an air-cleaning device, which is cost efficient for sensitive environments.

The solution is achieved by an air-cleaning device with the characterizing features of claim 1. More specifically, claim 1 according to the present invention relates to an air-cleaning device for air cleaning in sensitive environments such as operating rooms, drug manufacture, micro-chip production (processing industry) and similar areas. The air-cleaning device comprises a clean-air assembly with an inlet, through which air is sucked in from the ventilated room by means of a fan arranged in the clean-air assembly. The clean-air assembly further comprises an air duct which is adjustably arranged, said air duct transporting the air from the clean-air assembly to an exhaust-air distributing unit, arranged at the clean-air assembly. To said unit, a screen for clean-air distribution is arranged, the screen comprising at least one pressure-fall increasing means. The means for increasing pressure-fall ensures that the velocity of the exhaust air is leveled out and distributes a low turbulent or laminar airflow. In the air-cleaning device is further arranged at least one filter for air cleaning. The air-cleaning device is a unit arranged to be mobile in the room, whereby the exhaust-air distributing unit can be moved and directed in such way that a laminar/low-turbulent airflow is distributed where it is desired in the room without being hindered by personnel or other equipment in the airflow path to a specific area of the room.

Thereby, an air-cleaning device in rooms with sensitive environments is achieved, which enables simple and flexible direction of clean air to a desired area with high precision. The solution according to the invention is not affected by existing ventilation, equipment or personnel. The mobile air-cleaning device results in simple adaptation to different activities (such as e.g. surgical operations, micro-chip production etc.). A particularly advantageous application of the air-cleaning device is in an operating environment, where it increases the availability of an operating room and thereby allows more operations as well as results in that simple surgical operations do not have to be performed in an operating room, leading to a more efficient utilization of the operating rooms. A further advantage is that the present air-cleaning device admits a considerable cost reduction as compared to conventional technology.

In this description, the term "clean" airflow will refer to a particle reduced airflow, which popularly may be denoted ultra-clean. In the most optimal case, the clean airflow is even sterilized when leaving the air-cleaning device.

According to a preferred embodiment of the present invention the screen to the air-cleaning device comprises one or more plates for increasing pressure-fall.

According to another preferred embodiment of the present invention the air duct in the air-cleaning device comprises means for moving the screen in the x-, y- and z-direction.

The present invention also comprises a method of producing an air-cleaning device for air cleaning in sensitive environments such as operating rooms, drug manufacture, micro-chip production (processing industry) and similar areas. In the air-cleaning device is arranged a clean-air assembly with an inlet, through which air is sucked in from the ventilated room by means of a fan, which is arranged in the clean-air assembly. To the clean-air assembly is further arranged an adjustably arranged air duct, at the clean-air assembly is arranged an exhaust-air distributing unit, said air duct transporting the air from the clean-air assembly to the exhaust-air distributing unit. In said exhaust-air distributing unit a screen for clean-air distribution is arranged, the screen being comprised of at least one pressure-fall increasing means which levels out the velocity of the exhaust air and distributes a low-turbulent or laminar airflow. In the air-cleaning device is further arranged at least one filter for air cleaning. The air-cleaning device is arranged as a unit mobile in the room, whereby the exhaust-air distributing unit can be moved and directed in such way that a laminar/low-turbulent airflow can be distributed where desired in the room without being hindered by personnel or other equipment in the airflow path to a specific area of the room.

The present invention also comprises a use of an air-cleaning device, as described above, for an operating table in an operating room.

DESCRIPTION OF THE DRAWINGS

The invention will now be described more in detail as a non-limiting exemplary embodiment, illustrated by the appended drawings, in which.

DESCRIPTION OF EXEMPLARY EMBODIMENTS

Figure 1A:
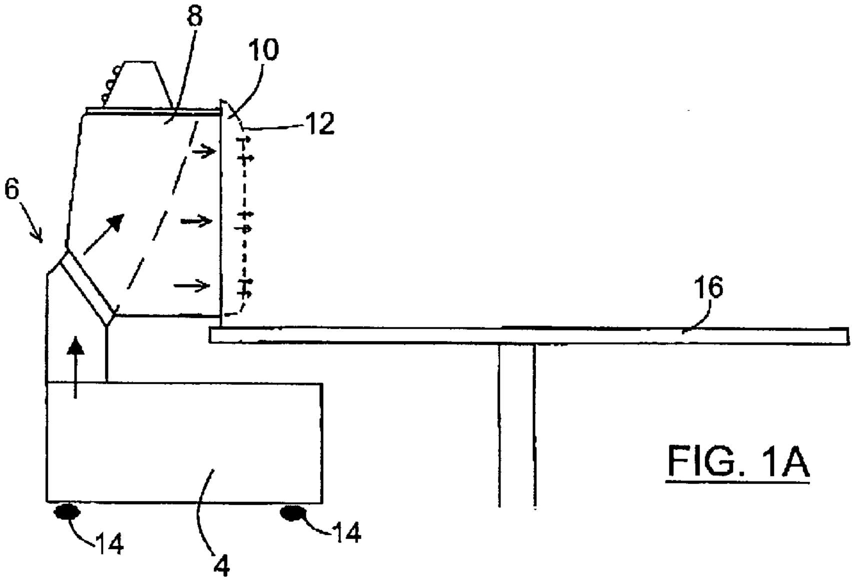
FIG. 1A shows a direct side view of a mobile air-cleaning device.
Figure 1B:
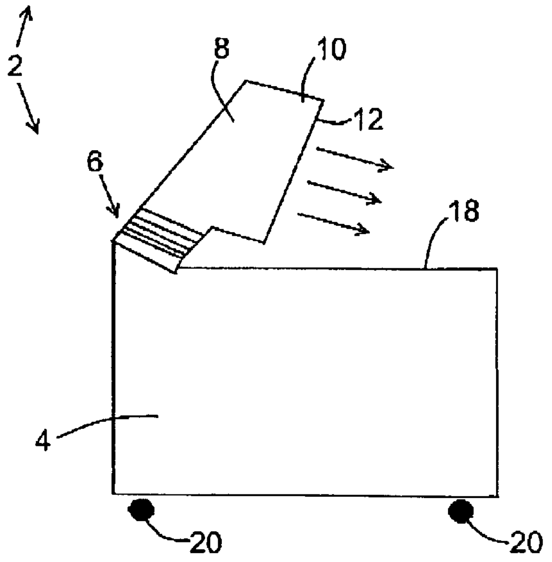
FIG. 1B shows a direct side view of an alternative embodiment of a mobile air-cleaning device.

FIG. 1A shows an air-cleaning device 2 comprising a clean-air assembly 4 with an inlet (not shown), through which air is sucked in from the ventilated room by means of a fan (not shown) arranged inside the clean-air assembly. The airflow (indicated by arrows) is via an adjustable air duct 6 transported from the clean-air assembly 4 to an exhaust-air distributing unit 8. To said unit 8 is arranged a screen 10 for clean-air distribution, the screen comprising at least one pressure-fall increasing means 12 such as a weave, net or the like. In the air-cleaning device 2 is further arranged at least one filter (not shown) for air filtration. The filter may be arranged in the exhaust-air distributing unit 8 and, except being a filter, consist of a pressure-fall increasing means. The air-cleaning device is a mobile unit in that the device in itself is provided with wheels 14 as shown in FIG. 1A and arranged at an operating table 16, or in that the device is arranged to another movable unit such as a mobile instrument table 18 (which guarantees that the instruments, e.g. surgical instruments, are always protected by the clean air) provided with wheels 20 as disclosed by FIG. 1B, or arranged to be fixed and constituting part of a mobile operating table. Advantageously, one air-cleaning device may be providing a clean airflow over the instrument table while another air-cleaning device provides a clean airflow over the operating table. Thereby, the exhaust-air distributing unit can be moved and directed in such way that a laminar/low-turbulent airflow is distributed where desired in the room without being hindered by personnel or other equipment in the airflow path to a specific area in the room. The possibility, offered by the air-cleaning device according to the present invention, of directing the air-distributing screen in such way that the laminar/low-turbulent airflow has a direction parallel to the operating table, as shown in FIG. 1A, is very important. It may be preferred to angle the screen slightly downward as shown in FIG. 1B (see the arrows) when the clean airflow is to provide clean air over an instrument table 18.

By means of a fan air is sucked from the ventilated room or from the ventilation system thereof into the equipment where the air is filtered with a high-efficiency filter. According to one embodiment the clean-air assembly 4 may also be provided with a disinfectant chamber, a so called UVC-unit consisting of bacteria-eliminating UVC-light at a wavelength of 200 nm–280 nm. Also other disinfectant, bacteria-eliminating methods and devices, such as for instance ultrasound or a flash lamp (Xenon), may be used. Therefore, the air assembly is practically independent of the quality of the surrounding air. According to one alternative, the air may also be moistened in a moistening chamber arranged in the clean-air assembly. A device for supply of heath and cold may also be included in the clean-air assembly. When the air has passed through the above-mentioned portion of the clean-air assembly 4, the air is, by means of a fan, further transported through an air duct 6, which may consist of a flexible hose from the assembly 4 to the distributing unit referred to as screen 8, in professional circles also known as a sterilized-air screen. The appearance of the screen may vary depending on the intended use. However, it always comprises a plane, spherical or ball-shaped hood with recesses for the incoming air and a front with a laminarizing function, which may consist of one or more pressure-fall increasing means. A weave or net has mesh-openings, which also may have different sizes. The purpose of the mesh-openings is to distribute the pressure and velocity of the airflow and laminarize the incoming air to obtain the desired effect of the exhaust air. It is very important that the exhaust air keeps the right velocity and has low-turbulent or laminar characteristics.

Figure 2:
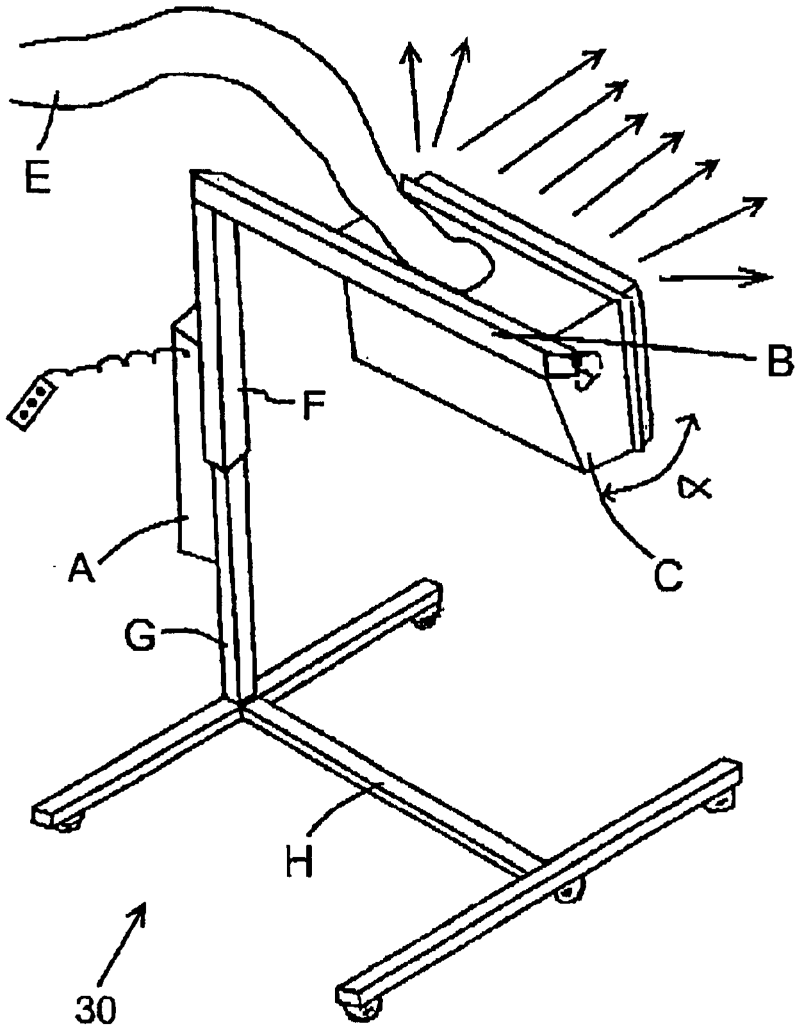
FIG. 2 shows a schematic perspective view of a stand holding a screen to an air-cleaning device.

It is important that the screen easily can be adjusted, in order to focus the clean air-stream around the wound area. This is possible for example by connecting the screen to a guide-system 30, flexible in the x-, y- and z-direction (horizontally, vertically and in depth) as illustrated in FIG. 2, which shows a stand holding merely the screen C of the air-cleaning device, providing personnel around an operating table with better space. An operating lamp may further be integrated in the screen C. An air-supply duct E is arranged between a clean-air assembly (not shown) and the screen C. A first telescope-arm portion F is arranged to a stand-structural member B. Vertical adjustment can be achieved by moving the first telescope-arm portion F upward or downward as compared to a second telescope-arm portion G arranged to the floor-stand member H. The control may be electronic by means of an engine unit with button controls. The adjustment may also be achieved using a contact-free equipment, such as a remote control or the like. The arm A is as shown in FIG. 2, fixed to the telescope-arm portion F, but could of course also be rotative as compared to the telescope-arm portion F. The screen C is rotatively arranged to the stand-structural member B, and can be adjusted in a direction opposite its extension in length. The screen may advantageously be angled by a at least 180° and thereby directed up towards the ceiling or straight down towards the floor.

Figure 3A:
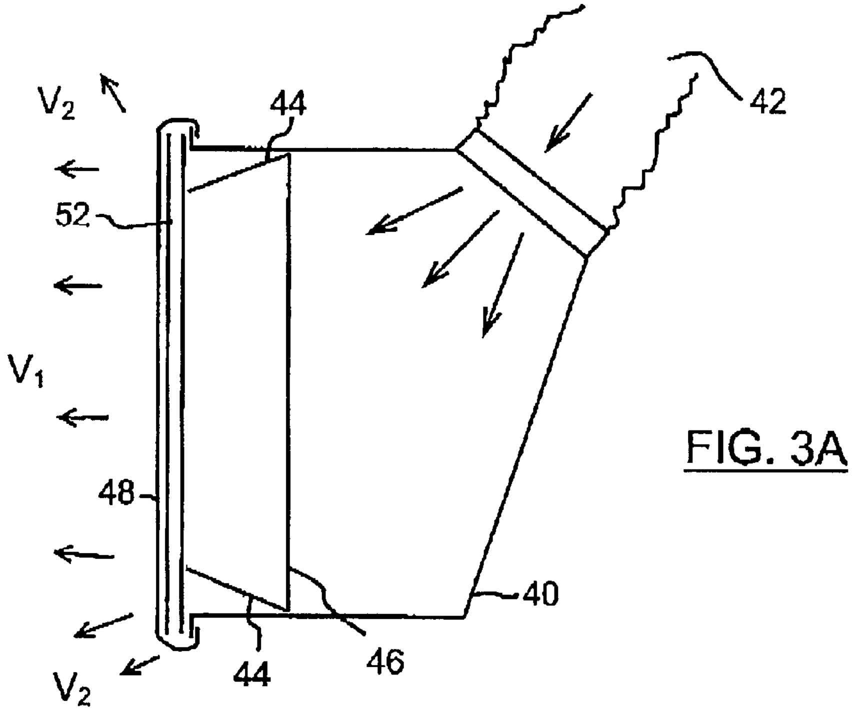
FIG. 3A illustrates a schematic side section of a screen to an air-cleaning device.
Figure 3B:
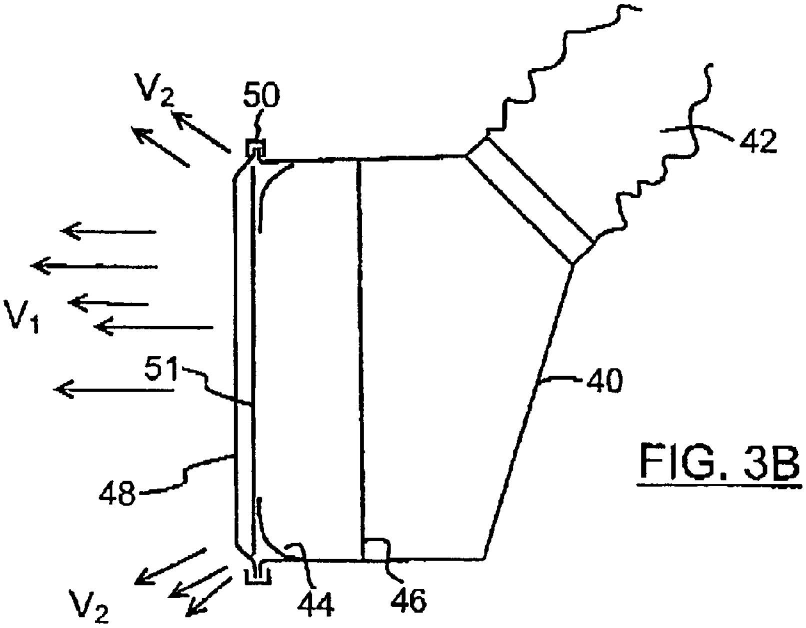
FIG. 3B illustrates a schematic side section of an alternative embodiment of a screen to an air-cleaning device.

FIGS. 3A and 3B illustrate a screen 40 of an air-cleaning device. An air-supply duct consisting of a flexible hose 42 is arranged from a clean-air assembly (not shown). The screen comprises at least one pressure-fall increasing means 44, 46, 48 such as a weave, net or the like. The pressure-fall increasing means 44, 46, 48 may also consist of a sheet/plate with microscopic apertures of cellular plastics, a fiber plate, or a foam plastic with microscopic channels. The important thing is that the pressure-fall increasing means is able to produce a laminar/low-turbulent airflow. The through apertures in the pressure-fall increasing means may have a certain extension in length and thereby preferably form channels. The channels may also be formed by placing several pressure-fall increasing means adjacent to each other. The apertures may have a diameter of a few millimeter. Preferably, the aperture diameter is some twenty or thirty micrometer or less, however. The pressure-fall increasing means levels out the velocity of the exhaust air and distributes a low-turbulent or laminar airflow. The screen 40 may consist of an outer cover with an air-supply side with a sleeve coupling and an air-exhaust side consisting of a pressure- and velocity-affecting device, the purpose of which is to control the clean air-flow, advantageously to a higher velocity $V_1$ in the central section than the surrounding velocity $V_2$ at the outer edges. This can be achieved using a control grid consisting of an angled distribution plate 44 (which may be perforated), or an angled plate or another velocity-reducing barrier. Furthermore, it is important that there is one straight laminar airflow $V_1$, and one airflow $V_2$ directed slightly out towards the sides and upward-downward in order to avoid ejection of dirty room air to the critical central area. Typical velocities may be around 0.5–0.8 m/s in the center $V_1$ and 0.1–0.6 m/s at the edges $V_2$ that meet the stationary room air, which results in a minimum admixture of room air. The air with a lower velocity $V_2$ is above all directed out from the edges, in a direction different from the laminar/low-turbulent flow, and thus acts as a sluice at movements in/out towards the critical zone. This airflow with a lower velocity $V_2$ may flow at an angle of 20–30° as compared to the laminar/low-turbulent flow $V_1$ in the screen center. At the transition at the edge, from the front side of the screen to the side surface thereof, airflow with lower velocity $V_2$ may be at 90° angle as compared to the laminar/low-turbulent flow at the screen center $V_1$. The transition of the airflow direction from the edge to the screen center may be gradual. The important thing is to ensure that the airflow at higher velocities (>0.5 m/s) does not risk being transformed into a turbulent flow. As for the projectile length of the air, it would be optimal to use a front plate, an unfixed straight plate with slightly bent edges. The velocity reduction may also be achieved by denser or more front plates at the edges, thereby creating a higher pressure-fall around the plate than at the center. A further arranged pressure-fall increasing sheet/plate, also referred to as a distribution plate, is not required but may be appropriate. The final pressure fall may be at the front plates, at least one may have different thicknesses, of which the outermost one may be a close-meshed cloth or the like, providing very low turbulence or a laminar flow.

As disclosed in FIGS. 3A and 3B, an angled distribution plate 44 is arranged at the screen edges, which plate lies against a pressure-fall increasing means such as a sheet or a cloth. In this way, a lower velocity $V_2$ is obtained at the screen edges. An outer pressure-fall increasing means 48 is tightened by montage of strips 50, clasps, velour hooks or the like against another pressure-fall increasing plate 51 in the screen, as shown in FIG. 3B. According to FIG. 3A, a wide-meshed net 52, which holds the outer more close-meshed pressure-fall increasing means 48, may also be arranged inside the outer pressure-fall increasing means 48.

Figure 4B:
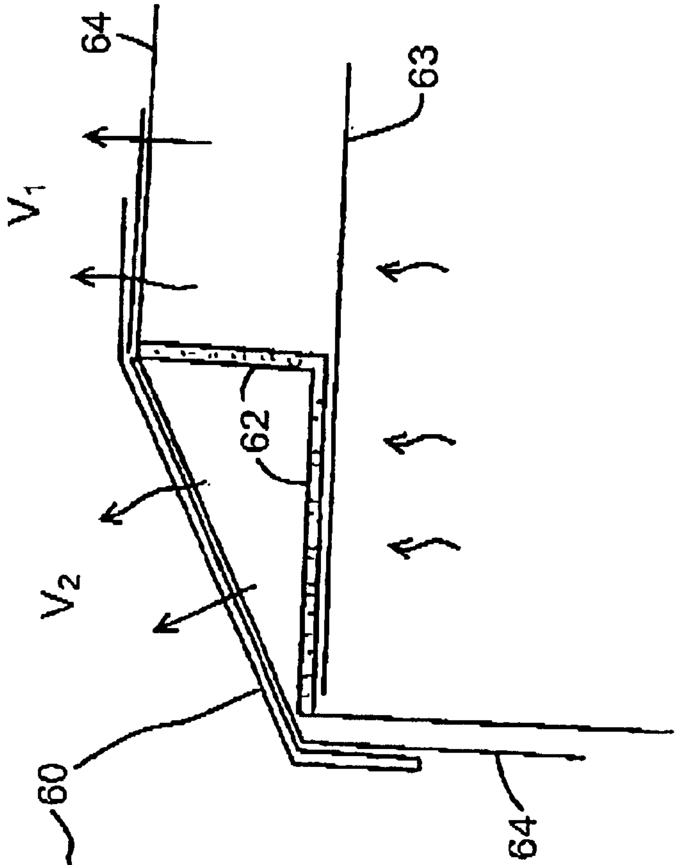
FIG. 4B illustrates an enlarged side section of a corner of the screen according to FIG. 4A.
Figure 4A:
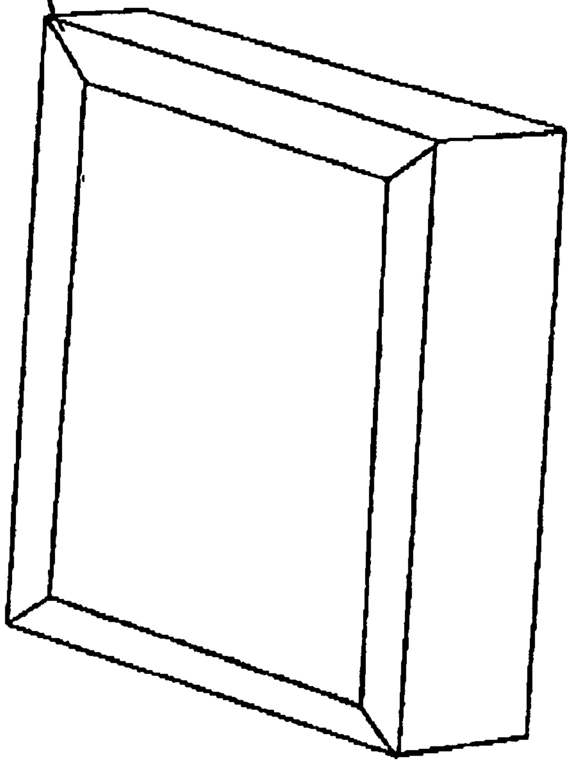
FIG. 4A shows a schematic perspective view of a pressure-fall increasing means for a screen.

FIG. 4A shows a front 60 for a screen. This front 60 may be washable or disposable and simple to remove and discard, alternatively disinfect if it has been contaminated with blood or the like. As disclosed by the enlargement in FIG. 4B, is arranged a distribution plate 62 consisting of an angled perforated plate with an aperture surface of 60–70% which constitutes a frame around the screen edges and the purpose of which is to increase the pressure fall towards the edges. Inside the angled perforated plate 62 yet another pressure-fall increasing means 63 is arranged. Thereby, the air has a reduced velocity $V_2$ when finally passing through the outer pressure-fall increasing means 64 consisting of a stretched weave/cloth/net. This provides a higher velocity $V_1$ at the center, i.e. in the middle of the screen, where the pressure fall is less. The air-cleaning device may be provided with different screens depending on the type of operation. The screen may be integrated with the operating lamp and provided with a flexible hose for air transport from the filter unit. This implies a great advantage since the operating personnel can direct both light focus and clean-air focus towards the desired area by one single lamp maneuver.

What is claimed is:

1. A method of arranging air cleaning in sensitive environments, comprising arranging a clean-air assembly in an air-cleaning device and arranging an exhaust-air distributing unit at the clean-air assembly, comprising the steps of:

arranging a screen at the exhaust-air distributing unit;

positioning said screen substantially vertically to provide a substantially horizontal laminar/low-turbulent airflow;

controlling the velocity of the clean air through the screen, by an angled distribution plate located adjacent to the screen, so that the clean air flows at at least two different velocities which are generated at one of two separate locations at the screen; and arranging the air-cleaning device as a unit mobile in a room, whereby said exhaust-air distributing unit can be moved and directed in such way that said laminar/low-turbulent airflow is distributed where it is desired in the room.

2. A movable air-cleaning device for air cleaning in sensitive environments comprising a clean-air assembly with an inlet, through which air is sucked in from a ventilated room by means of a fan arranged in the clean-air assembly, an adjustably arranged air duct, the adjustably arranged air duct transporting air from said clean-air assembly to the clean-air assembly arranged exhaust-air distributing unit;

at least one filter is further arranged in the air-cleaning device for air cleaning;

a screen arranged in said exhaust-air distributing unit for clean-air distribution and positioned substantially vertically to provide a substantially horizontal laminar/low-turbulent airflow; and an angled distribution plate provided adjacent to said screen and controls the velocity of the clean air through the screen so that the clean air flows at at least two different velocities, each different velocity being generated at one of two separate locations on the screen, said air-cleaning device being a unit arranged to be mobile in a room, whereby said exhaust-air distributing unit can be moved and directed in such way that a laminar/low-turbulent airflow is distributed where desired in the room.

3. The air-cleaning device according to claim 2, wherein the angled distribution plate is arranged in the screen to provide exhaust air with higher velocity in a center of the screen compared to velocities at the edges of the screen.

4. The air-cleaning device according to claim 2, wherein the angled distribution plate is arranged in the screen, the exhaust air at the edges of the screen having a direction different from said laminar airflow distributed from an area around a central area of the screen.

5. The air-cleaning device according to claim 2, wherein said air-cleaning device is arranged at an instrument table or an operating table used for surgical operations.

6. The air-cleaning device according to claim 2, wherein a disinfecting, bacteria-eliminating chamber is arranged within said clean-air assembly.

7. The air-cleaning device according to claim 2, wherein said adjustably arranged air duct is arranged at an articulated system of arms, movable in x-, y- and z-direction.

8. The air-cleaning device according to any of the preceding claims, wherein said at least one filter is arranged in said exhaust-air distributing unit and comprising pressure-fall increasing means.

9. The air-cleaning device according to claim 2, wherein a detachable front is arranged adjacent to the screen, the front covering a substantial portion of an air-emitting surface of the screen.

* * * * *